United States Patent
Iverson et al.

(10) Patent No.: US 10,210,668 B2
(45) Date of Patent: Feb. 19, 2019

(54) TECHNIQUE FOR EXTRUDING A 3D OBJECT INTO A PLANE

(71) Applicant: Microsoft Technology Licensing, LLC, Redmond, WA (US)

(72) Inventors: Kristofer N. Iverson, Redmond, WA (US); Emmett Lalish, Seattle, WA (US); Gheorghe Marius Gheorghescu, Bratislava (SK); Jan Jakubovic, Bratislava (SK); Martin Kusnier, Bratislava (SK); Vladimir Sisolak, Bratislava (SK); Tibor Szaszi, Bratislava (SK)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

(21) Appl. No.: 15/052,027

(22) Filed: Feb. 24, 2016

(65) Prior Publication Data
US 2017/0132846 A1    May 11, 2017

Related U.S. Application Data

(60) Provisional application No. 62/252,346, filed on Nov. 6, 2015.

(51) Int. Cl.
| | |
|---|---|
| *G06T 19/20* | (2011.01) |
| *G06T 15/40* | (2011.01) |
| *G06T 17/20* | (2006.01) |
| *G06T 17/00* | (2006.01) |
| *G06T 17/10* | (2006.01) |

(52) U.S. Cl.
CPC .............. *G06T 19/20* (2013.01); *G06T 15/40* (2013.01); *G06T 17/00* (2013.01); *G06T 17/10* (2013.01); *G06T 17/20* (2013.01); *G06T 2219/2004* (2013.01)

(58) Field of Classification Search
None
See application file for complete search history.

(56) References Cited

U.S. PATENT DOCUMENTS

| | | |
|---|---|---|
| 8,659,599 B2 | 2/2014 | Carr et al. |
| 2008/0208547 A1 | 8/2008 | Kim et al. |

(Continued)

OTHER PUBLICATIONS

Martin von Wyss; "3D-Printed Landform Models"; Cartographic Perspectives; vol. 79; 2014; p. 61-67.

(Continued)

*Primary Examiner* — Kyle Zhai

(57) ABSTRACT

Techniques are described for generating a three dimensional (3D) object from complete or partial 3D data. Image data defining or partially defining a 3D object may be obtained. Using that data, a common plane facing surface of the 3D object may be defined that is substantially parallel to a common plane (e.g., ground plane). One or more edges of the common plane facing surface may be determined, and extended to the common plane. A bottom surface, which is bound by the one or more extended edges and is parallel with the common plane, may be generated based on the common-plane facing surface. In some aspects, defining the common plane facing surface may include segmenting the image data into a plurality of polygons, orienting at least one of the polygons to face the common plane, and discarding occluding polygons.

20 Claims, 11 Drawing Sheets

(56) References Cited

U.S. PATENT DOCUMENTS

| | | | |
|---|---|---|---|
| 2009/0110327 A1* | 4/2009 | Chen ...................... | G06T 17/10 382/285 |
| 2012/0069011 A1 | 3/2012 | Hurt et al. | |
| 2012/0162225 A1* | 6/2012 | Yang ................. | G06F 17/30241 345/420 |
| 2014/0363532 A1 | 12/2014 | Wolfgram | |
| 2015/0005919 A1 | 1/2015 | McGatha et al. | |
| 2015/0066178 A1 | 3/2015 | Stava | |
| 2015/0151492 A1 | 6/2015 | Schmidt | |
| 2015/0165675 A1 | 6/2015 | Dawson et al. | |
| 2015/0187130 A1 | 7/2015 | Guskov et al. | |
| 2015/0269289 A1 | 9/2015 | Kim et al. | |
| 2015/0277811 A1 | 10/2015 | Lee et al. | |

OTHER PUBLICATIONS

Dumas et al.; "Bridging the Gap: Automated Steady Scaffoldings for 3D Printing"; ACM Transactions on Graphic; vol. 33 No. 4; Jul. 2014; p. 98:1-98:10.

Strano et al.; A new approach to the design and optimization of support structures in additive manufacturing; Int'l Journal of Advanced Manufacturing Technology; vol. 66; 2013; p. 1247-1254.

Kristen S. Kurland; "AutoCAD 3D Tutorials"; Autodesk, Inc.; © 2012; 4 pages.

Huang et al.; "Slice Data Based Support Generation Algorithm for Fused Deposition Modeling"; Tsinghua Science and Technology; vol. 14 No. S1; Jun. 2009; p. 223-228.

International Patent Application No. PCT/US2016/058411; Int'l Search Report and the Written Opinion; dated Feb. 2, 2017; 18 pages.

"Autodesk 3DS Max—Extrude Modifier", Published on: Dec. 17, 2014 Available at: http://knowledge.autodesk.com/support/3ds-max/learn-explore/caas/CloudHelp/cloudhelp/2015/ENU/3DSMax/files/GUID-36DF6364-2624-4CE1-8AC0-5CEED91CB393-htm.html.

"International Preliminary Report on Patentability Issued in PCT Application No. PCT/US2016/058411", dated Sep. 1, 2017, 8 Pages.

\* cited by examiner

TECHNIQUE FOR EXTRUDING A 3D OBJECT INTO A PLANE

TECHNICAL FIELD

This disclosure relates generally to three-dimensional (3D) modeling, and more specifically to extruding or extending 3D objects to a plane, for example, to provide a support for the 3D object and to enable 3D printing.

BACKGROUND

Creating 3D image data, such as 3D objects, presents particular challenges both in terms of the complexity of modeling 3D objects and of generating 3D objects to accurately portray real-life objects. Adding to these challenges is the recent application of 3D data to 3D printing, which typically requires full 3D object definition to produce a complete object or product. Current techniques used to create 3D objects or 3D image data include CAD/CAM software products, 3D scanning sensors, and the like. However, these and other 3D modeling techniques often require specific and comprehensive technical expertise, expensive software tools or chains of such tools, or may even require dedicated hardware, such as sensors. These requirements present barriers for the widespread use of 3D modeling.

Currently, there exists techniques for taking 3D data and repairing the data such that the data represents a true volume with a distinct outer shell and interior, capable of being 3D printed. However, these techniques may not output a 3D object that is very refined. For example, a 3D export of map data may generate a visually appealing surface; however, the underlying mesh may be uneven or incomplete. In this example, if the 3D export were printed, it may not stick to the platform or may lean over in away that does not represent the direction of the original topography. In another example, 3D scan data of a person's face may be used to generate a shell or mask. The mask can be made printable, but may not be refined in a way that is appealing, for example, to a user.

Accordingly, there is a need for better and more intuitive techniques for modifying 3D data, for example, for printing and other applications.

SUMMARY

Illustrative examples of the disclosure include, without limitation, methods, systems, and various devices. In one aspect, techniques for generating a three dimensional (3D) object from complete or partial 3D data may be improved. Image data defining or partially defining a 3D object may be obtained. Using that data, a common plane facing surface of the 3D object may be defined that is substantially parallel to a common plane (e.g., ground plane). One or more edges of the common plane facing surface may be determined, and extended to the common plane. A bottom surface, which is bound by the one or more extended edges and is parallel with the common plane, may be generated based on the common-plane facing surface.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
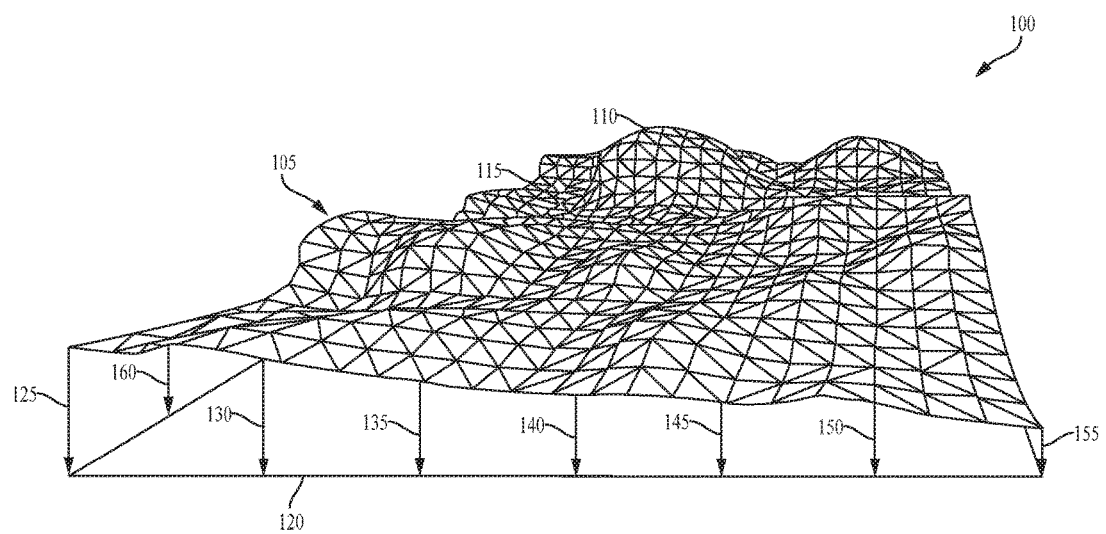
FIG. 1 depicts an example of an extrusion of a partially defined or non-manifold 3D object representing map data onto a ground plane.

Systems and techniques are described herein for extruding or extending a 3D object towards a plane in a 3D space, for example, to construct a base or support for the 3D object. In one aspect, the described techniques may be used to extrude a fully defined and enclosed 3D object, herein referred to as a manifold object or a manifold mesh, for example, using a 3D modeling application or tool. In another aspect, the described techniques may be used to enclose and extrude a partially defined 3D object, herein referred to as a non-manifold object or a non-manifold mesh, for example, also using a 3D modeling application or tool. The described techniques may provide an easy to use general tool for manipulating 3D image data and objects, and for generating 3D objects that may be printed, for example, and displayed on a flat surface. The described techniques may be implemented in a standalone application or program, as a cloud service, may be included in an existing or separate 3D modeling application, program, platform, etc.

In one example, image data may be obtained, for example, including map data, object data, one or more bitmaps, or other image data from various sources. The image data may include full 3D image data. The image data may define one or more objects via an enclosed volume. The image data may additionally or alternatively include partially defined 3D image data, such that only a portion of one or more 3D objects are defined (e.g., map data taken from a mapping or routing application).

At least one surface or a part of a surface defined in the image data may be used and/or manipulated to define a surface that faces a common plane, such as aground plane. This surface may be extended or extruded to the common plane. The extrusion may include defining one or more edges of the common plane-facing surface and extending the one or more edges to the common plane. A bottom or cap may then be generated, for example, based on the common plane-facing surface, and connected to the extended edges. Any manipulation of the original surface may then be reversed, for example, to enclose a volume representing the object originally defined in the image data in combination with an extruded volume that connects at least one surface of the object to a common plane. In some aspects, the extruded volume may be separately defined, for example, to enable further independent manipulation of one or more of the object and the extruded portion or support.

In one example, the obtained image data may be manipulated or modified (e.g., flipped) to orient one or more objects contained in the image data toward a common plane. In some aspects, this may include segmenting the image data into a number of polygons or shapes, and flipping one or more of the polygons to orient the polygons to face the common plane. In some aspects, such as where the image data defines a manifold 3D object, the manipulation may be omitted; however, the object may still be divided into polygons. In both cases, the polygons facing the common plane may be identified, and edges surrounding those polygons constructed, so as to partially define an extruded portion of the object toward the common plane. A bottom or flat surface may then be added to the extruded edges opposite the object to fully enclose a volume within the extruded portion of the object along the common plane. The polygons that were previously manipulated (flipped) may then be oriented back to their original orientation to restore the objects contained within the image data. The resulting image data defining at least one extruded 3D object may then be output, such as displayed in a user interface of a 3D modeling or builder application, prepared and/or sent to a 3D printer for 3D printing, etc.

In one aspect, the described techniques may be used to generate a separate object or mesh for the extruded area that can be assigned, for example, a different color, texture, material, etc., such as support material for 3D printing. The extruded object mesh may be modified in the 3D modeling application and saved, stored, or shared independently of the 3D object. In this way, the support structure mesh may be defined prior to sending the 3D object to a 3D printer. Current techniques, on the other hand, may not provide much if any customization options to a user while designing and printing the support structure. This implementation may be particularly useful where the 3D object or content creator and the content consumer are different actors, or the tasks are separated between different machines, programs, applications, etc.

In another example, image data, for example, representing a human face, may be obtained from an image file or via a camera or image sensor scanning a person's face. The described techniques may be used to complete or fill-in the image data representing the face and extrude a backside of the face image data toward a plane and also extrude the image data down toward another plane to form a bust of the face. In one example, a surface of the face may be mirrored about the plane on which the face is aligned and used to create a back surface of the bust. The surface of the face may then be extruded to the back surface. A portion or all of the resulting downward facing surface (e.g., orthogonal to the face surface) may then be defined (for example, as a circle or oval representing a neck, the dimensions of which may be defined relative to the size of the face surface), may then be extruded downward to a flat surface, to provide a stand or support for the bust. In this way, a high quality 3D printable bust may be created from image data with minimal manual input or manipulation.

In another example, the image data may include one or more charts, graphs, or other graphic representation of data. The described techniques may be used to generate a 3D printable model of the chart, for example, by extruding visual elements of the chart (e.g., bars, pipes, lines with a thickness, etc.) to one or more common planes. In some aspects, the extrusion process may include extruding the image data towards a back surface, while creating a bottom surface via a flat or planar edge used to create the backward extrusion.

In another example, the described techniques may be applied to a 3D model to extrude the 3D object between two or more identified portions of the 3D object to connect the two or more portions. This example may include or be similar to applying a flood-fill function to 3D image data.

It should be appreciated that the described techniques may be applied to various 3D image modeling and manipulations, beyond extrusion or defining a support for a 3D object.

In some aspects, the described techniques may provide various advantages, including reducing the number of steps a user is required to take, for example, via a user interface, to define and configure a support structure for a 3D object. The described techniques may also provide for a support structure that is compatible with multiple different 3D printers, driver/slicers/etc., by defining the support structure separate from the 3D object. In some aspects, the described techniques may provide amore efficient process for defining, configuring, and printing a 3D support structure, for example that may reduce processor load and/or may conserve memory resources FIG. 1 illustrates an example diagram and process 100 of extruding 3D image data 105 representing terrain features onto a ground plane 120. In the example illustrated, the 3D image data 105 may be non-manifold data, such that the data includes at least one non-manifold surface or object (e.g., the image data does not fully enclose a volume of space.) The image data 105 may represent data taken from a map or navigation application, such as Bing Maps. The image data 105 may define various features, for example hills 110, valleys 115, or any of a number of other terrain features, objects, buildings, people, and so on. According to the techniques described in greater detail below, the terrain image data 105 may be extruded onto a ground plane 120. The extrusion process may include manipulating the surface-defining terrain in the image data 105 to face the ground plane 120, defining edges of the downward facing surface and extruding the edges to the ground plane, indicated via arrows 125-160. The downward-facing surface may then be translated to the around plane 120 to define a cap or bottom surface, and connected to the extruded edges, thus enclosing a volume between surface 105 and ground plane 120.

In one aspect, the 3D image data 105 may be combined with the extruded portion to form a single object enclosing a single volume. In this scenario, the extruded 3D image data 105 may be 3D printed, for example, so that it can firmly stand on a flat horizontal surface. In another aspect, the extruded portion may be separately defined as an object or image data separate from the image data 105 that fits or aligns with the bottom surface of the 3D image data 105. In this scenario, the extruded portion may be manipulated, modified, configured etc., independently of the 3D image data 105. This may enable greater customization of the 3D image data 105 and extruded portion, for example, for different 3D printers, applications, or even different actors.

Figure 2:
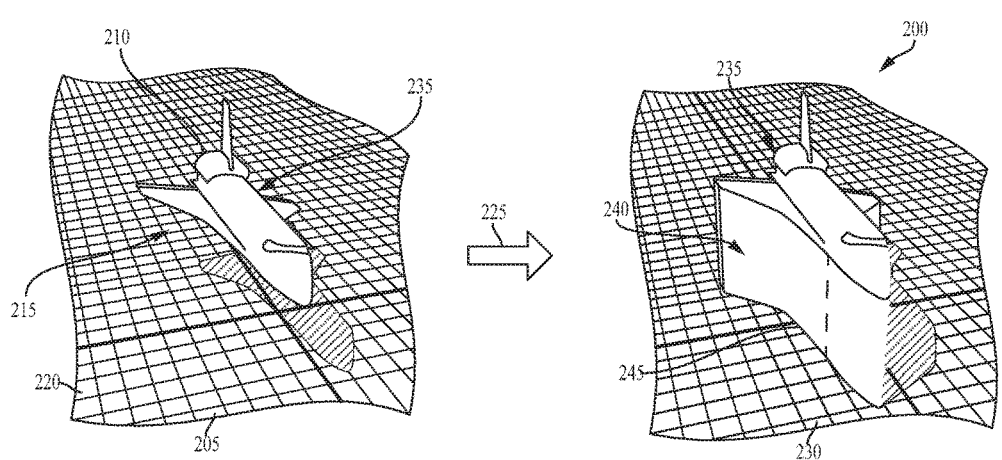
FIG. 2 depicts an example of an extrusion of a completely defined or manifold 3D object representing a space shuttle onto a ground plane.

FIG. 2 illustrates an example user interface 200 displaying an extrusion of 3D image data 210 representing a space shuttle, according to the described techniques. The 3D image data representing space shuttle 210 may include manifold image data that further includes a fully defined top or visible surface 235, and a fully defined bottom surface 215, which together encloses a volume of the space shuttle 210. A first screen or view 205 of the user interface 200 may display the space shuttle 210 above a plane or ground plane 220. The space shuttle 210 may be extruded via operation 225, according to the described techniques, to produce extruded 3D image data 230. Extruded 3D image data 230 may include a top surface 235 of space shuttle 210 and an extruded portion 240 which spans from the bottom surface 215 of the space shuttle 210 to a bottom surface 245, which is positioned on ground plane 220. In some aspects, the bottom surface may be positioned at any height parallel to the ground plane 220.

In some aspects, the extruded portion 240 may be formed or modeled as continuous with space shuttle 210. In other aspects, the extruded portion 240 may be modeled and defined as a separate volume relative to space shuttle 210. Forming the extruded portion 240 as a separate volume may enable greater customization and configuration of the extruded portion 240 relative to the space shuttle 210. In some cases, the extruded portion 240 may be associated with a different material, color, texture, consistency, to for example, conserve resources for 3D printing (e.g., using less material for the extruded portion 240 in the case it will be discarded). In another example, the extruded portion 240 may be associated with a different material or color to form an aesthetically pleasing support or base for 3D printed space shuttle 210.

Figure 3:
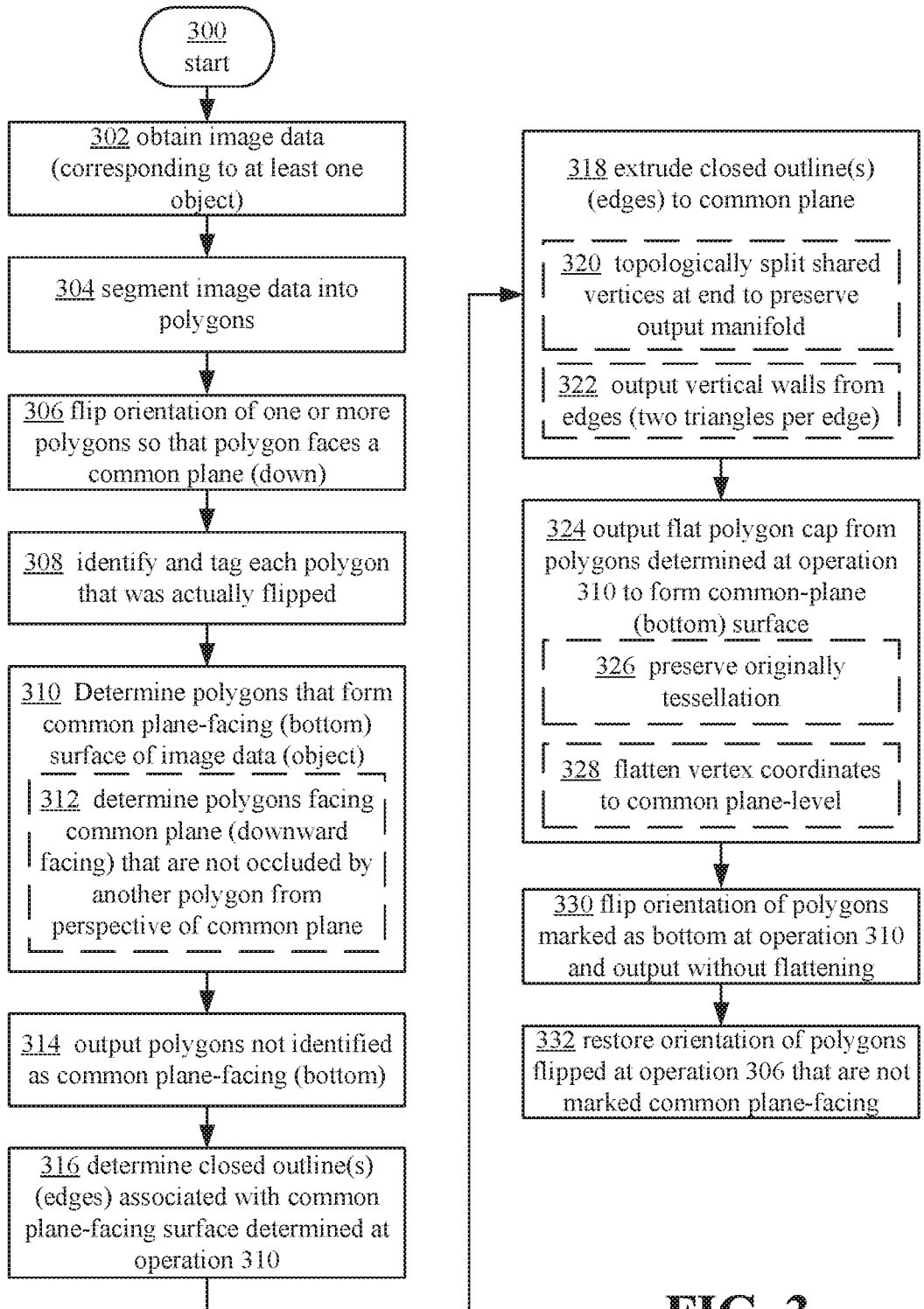
FIG. 3 depicts an example operational procedure for extruding image data associated with an object onto a ground plane.

FIG. 3 illustrates an example process 300 for extruding a 3D object to a plane in 3D space, such as a ground plane. In the follow description of process 300, it should be appreciated that directions such as top, bottom, etc., are used for ease of reference. The described techniques may be implemented on any plane and in any direction to a similar effect. In addition, process 300 may be implemented for both manifold and non-manifold surfaces or 3D objects. The differences in the process for these different implementations will be noted in the description below. In one aspect, the non-manifold case can be thought of as a manifold case with some additional pre-processing and post-processing steps performed to transform the non-manifold object into a manifold object.

Process 300 may begin at operation 302, where image data may be obtained, such that corresponds to at least one 3D or partial 3D object. The image data may include manifold and/or non-manifold objects or surfaces, such as image data 105 and 210, respectively. The image data may be obtained from a camera in communication with a device executing a 3D modeling application, may be obtained from one or more files or data stores local or remote to the executing device, from one or more other executing applications or programs (e.g., mapping or route finding applications) that provide a visual or graphical component (e.g., including various forms of media), and so on. Next, at operation 304, the image data may be segmented into polygons or other segments, such as other shapes, of various sizes, etc., for further processing and manipulation. The image data may be segmented or otherwise divided into a number of polygons or shapes, according to any of a variety of techniques, such as based on one or more features of the images data, changes or variation in the image data, such as in color, texture, shapes identified within the image data, etc.

In one example, the image data may include map data, which may be segmented based on identified features, such as buildings streets (e.g., into city blocks), water, land, rivers, hills, trees, foliage, etc.

In the non-manifold case, the orientation of one or more of the polygons or segments defining the image data may be flipped or modified, rotated, etc., so that each polygon faces a common plane, such as downward toward a ground plane, at operation 306. Each polygon that was flipped may be identified and tagged or marked at operation 308, for example, for purposes of restoring the original surface later in process 300.

Next, at operation 310, polygons that form the common plane-facing surface of the image data/object may be determined. In one example, the common plane-facing surface may be the bottom surface or non-visible surface of the object. In sonic aspects, operation 310 may further include operation 312, which may further include determining which polygons that face the common plane are not occluded (even in part) by another polygon from the perspective of the common plane. Next, at operation 314, polygons not identified as common plane-facing polygons may be associated with the final 3D object to be printed and output, for example, to a user interface of a 3D modeling application for display. A more detailed example of operations 310-314 will be described below in reference to FIGS. 6 and 7.

At operation 316, closed outlines or edges of the common plane-facing surface from operation 310 may be determined. The outlines or edges may form any of a variety of shapes, having different sizes, etc. In one example, this surface may correspond to the bottom surface of the 3D object. In some aspects, this surface may not be complete, or may include multiple different surfaces. The closed outlines/edges may then be extruded to the common plane, at operation 318. In some aspects, operation 318 may further include topologically spitting shared vertices at an end to preserve the output manifold mesh or object, at operation 320. Operation 318 will be described in more detail in reference to FIG. 4 below. Operation 318 may further include outputting vertical walls from edges at operation 322. Operation 322 may include defining each vertical edge wall with two triangles (e.g., to define a rectangle for the edge wall).

Next, a flat polygon cap may be formed from the polygons determined at operation 310 parallel with the common plane and output at operation 324. Operation 324 may topologically close the output mesh from the bottom or common plane. In some aspects, operation 324 may further include preserving the original tessellation or geometric pattern of polygons of the original surface or top surface that was used to form the flat polygon cap, at operation 326. In addition, operation 324 may further include flattening coordinates, such as vertex coordinates, of the common plane-facing surface to the common plane level to form the polygon cap or bottom surface, at operation 328. In some aspects, edges and vertices already extruded may take precedent over original (un-modified) edges and vertices.

In non-manifold applications, the orientation of polygons marked as bottom or common plane-facing at operation 310 may be flipped and output, for example, without any flattening, at operation 330. Also in non-manifold cases, the orientation of polygons flipped at operation 306 that are not marked as bottom or common plane-facing may be restored, at operation 332. In some cases, polygons that have already been extruded may be excluded from operation 332. At the conclusion of operation 332, a fully defined 3D object, with at least one surface extruded to a common facing plane, with the extruded portion enclosing a volume, may be output or rendered, for example, in a user interface of a 3D modeling application, sent to a 3D printer, etc.

Figure 4:
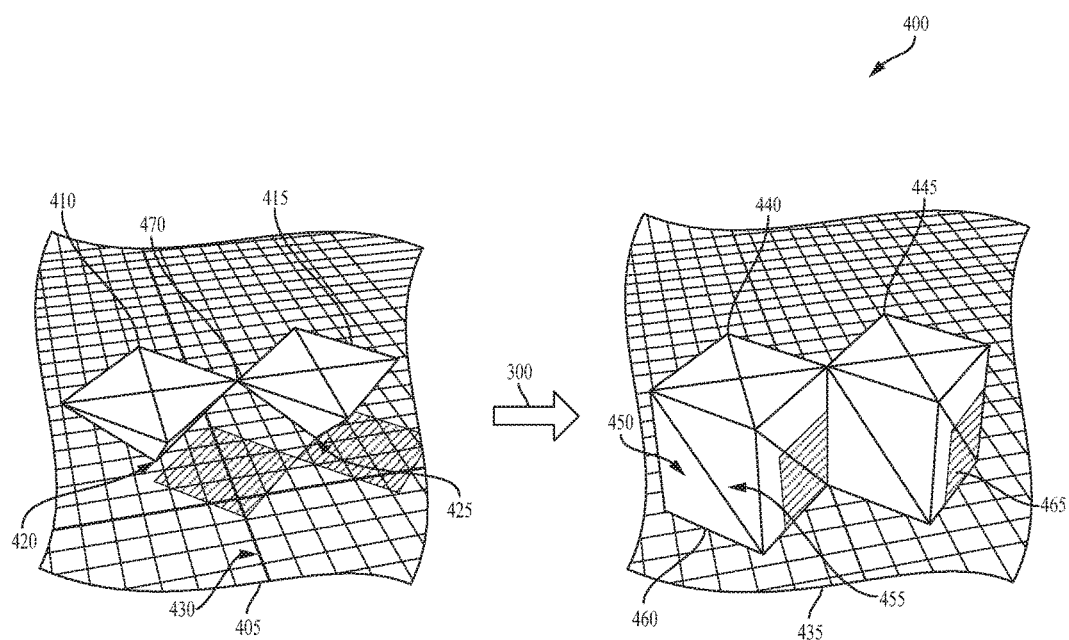
FIG. 4 depicts another example of an extrusion of multiple manifold 3D objects onto a ground plane.

FIG. 4 illustrates an example user interface, such as user interface 200 of FIG. 2, displaying an extrusion of 3D image data representing two distinct objects 410 and 415, according to the described techniques. Objects 410 and 415 may each include a rectangular surface (upward surface in the orientation illustrated), sharing a corner vertex 470 with each other. Objects 410 and 415 may each be defined by a rectangular pyramid-shaped bottom portion or surfaces 420 and 425. Objects 410 and 415 may be displayed in a first view of a user interface 405, such as provided by a 3D modeling application.

Objects 410 and 415 may be transformed via process 300 described above, to yield objects 440 and 445 displayed in a second view 435. Objects 440 and 445 may each define a rectangular prism (e.g., a cube) from the top surfaces of objects 410 and 415 to surfaces 460 and 465 located on ground plane 430. In some aspects, bottom surfaces 460, 465 may be located above or below the ground plane 430, for example, parallel with ground plane 430. According to process 300, each of the edges of objects 410, 415 may be extruded to the ground plane 430, for example, by forming a rectangular wall orientated vertically via generation of two triangular portions 450, 455. In the process 300 of extruding the objects 410 and 415 to ground plane 430, the shared vertex 470 between the two objects may be topologically split, for example, to enable separate and manifold definition of each extruded object 440, 445. By splitting the vertex 470, such that each object 410, 415 is separate and is defined by a separate corner at point 470, each extruded object 440, 445 may each enclose a separate volume, defined in the illustrated example by rectangular prisms.

Figure 5A:
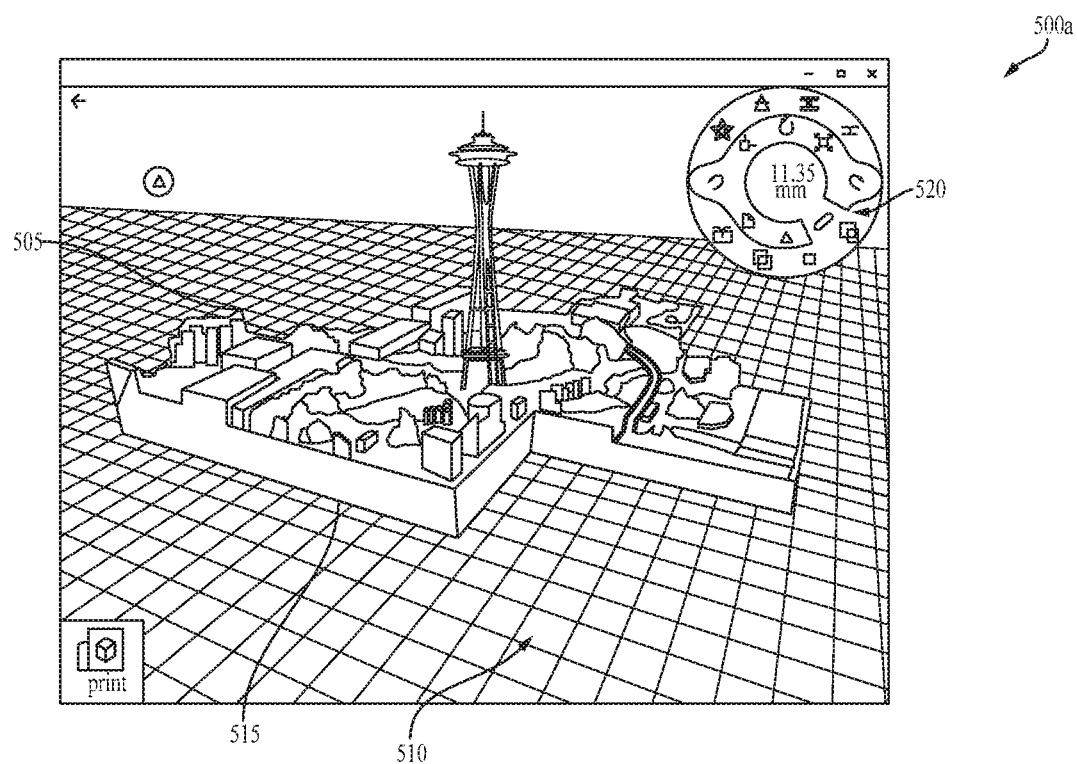
FIGS. 5A-5C depict an example of an extrusion of a complex 3D object representing a portion of a city onto a ground plane, and a user interface for interacting with the complex 3D object.

FIG. 5A illustrates an example 500a of more complex image data 505 extruded onto a common or ground plane 510. The complex image data 505 may represent a portion of a city, and may contain a large number of individual objects (non-manifold, manifold, or a combination thereof). By extruding the image data 505 down to ground plane 510 according to process 300, orientation, scale, proportionality, etc., of the image data 505 may be maintained and/or enhanced to enable 3D printing of the image data 505 extruded onto a ground plane 510. In some aspects, a separate support structure 515 including the extruded portion may be separately defined and independently configurable for 3D printing. In the example illustrated, 3D or partial 3D map data may be transformed into a full 3D model that may be 3D printed or rendered in a 3D modeling application for a variety of purposes. Also in the illustrated example, user interface controls 520 may provide controls for changing the view perspective of the image data 505 (panning, rotating, zooming, etc.), modifying the image data 505 itself (any of various image editing tools and 3D modeling tools), and other tools or selections.

Figure 5B:
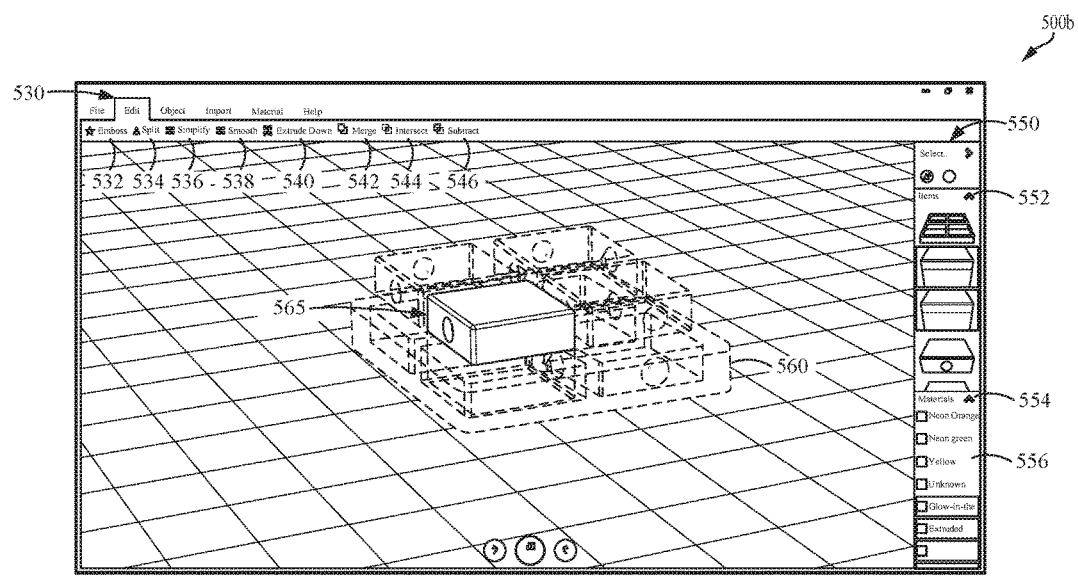
Figure 5C:
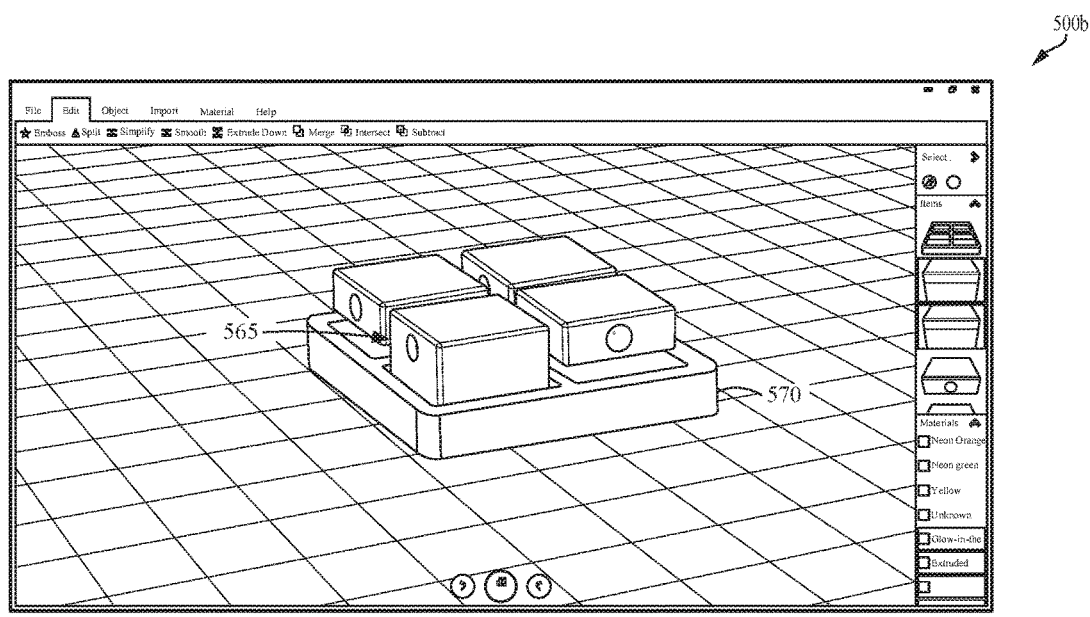

Other variations of user interface controls 520 are illustrated in user interface 500b of FIGS. 5B and 5C, which provide controls for viewing, modifying, and previewing 3D objects. User interface 500b may include various tools 530 for editing a 3D object, as well as other selectable menu items. Tools 530 may include selection options for embossing 532, splitting 534, simplifying 536, smoothing 538, extruding down 540 (as described above), merging two or more objects 542, intersecting two or more objects 544, and subtracting portions from one or more objects 546. In some aspects, a preview tool 550 may also be included in the user interface 500b, which provides for a preview of an extruded portion of the 3D object or support structure. The preview tool 550 may include various selection items for previewing extrusions or support structures for a 3D object, including item selections 552, material selections 554, which may list selectable outlining or visual indications 556 of the previewed elements, and other options not illustrated.

In the example illustrated in FIG. 5B, an extrusion 560 of a 3D object 565, which includes a rectangular prism having a hole on one side, may be previewed, as indicated by the structure illustrated with dashed lines. The preview tool 550 may enable a designer or other user of user interface 500b to better visualize and/or modify extrusions or support structures 560 of a 3D object 565, while maintaining a better or more clear visualization of the 3D object 565 itself.

FIG. 5C illustrates the same 3D object 565, with an extrusion or support 570, corresponding to the previewed support structure 560, but illustrated as having solid lines.

Figure 6:
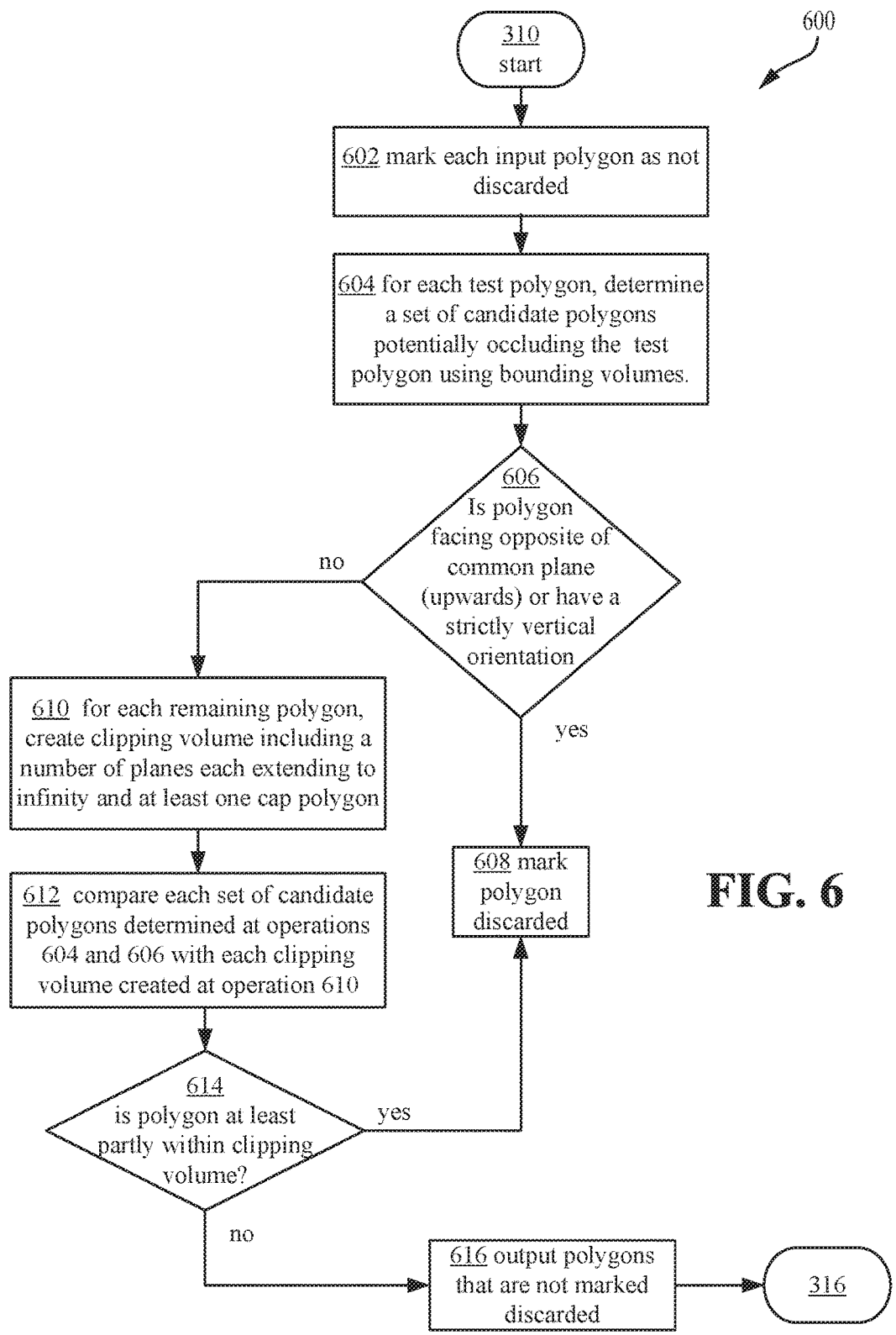
FIG. 6 depicts an example of a more detailed operational procedure for defining a surface of an object to extrude onto a plane.

FIG. 6 illustrates an example process 600 for determining a bottom or common plane-facing surface of an object, for example, for extruding the object to the common plane. In the example illustrated, process 600 may correspond to one or more of operations 310, 312, and 314 of process 300 described in reference to FIG. 3 above. Accordingly, process 600 may begin assuming that image data has been obtained and has been segmented into polygons (e.g., operations 302 and 304 of process 300). In the non-manifold example, process 600 may begin after one or more polygons have been flipped to orient them toward the common surface and marked (e.g., operations 306 and 308 of process 300).

Process 600 may begin at operation 602, where each input polygon may be identified or marked to indicate that the polygon is not discarded. Next, at operation 604, for each polygon, a set of candidate polygons potentially occluded by at least one other polygon may be determined, for example, using bounding volumes. Operation 604 may include, for example, creating a bounding volume that corresponds to an area of a first test polygon and extending that area toward the common surface. A subset of surrounding polygons may be selected, for example, based on proximity to the test polygon (e.g., a subset of polygons within a certain distance of the test polygon, for example, based on a percentage of at least one dimension of the polygon, a subset of polygons touching or immediately adjacent to the test polygon, or a subset selected based on other parameters, including relative angles of the subset to the test polygon, etc.). Using any of multiple techniques, the candidate set of potentially occluding polygons may be determined according to which polygons potentially intersect the bounding volume. At operation 606, it may be determined whether a polygon is facing opposite the common plane (upwards) or the polygon has a strictly vertical orientation, such that it is orthogonal to the common plane. If the result of the determination is yes, the polygon may be marked as discarded at operation 608. If the result of the determination at operation 606 is no, then for each remaining polygon, a clipping volume may be created that includes multiple planes each extending to infinity or at least past the common plane (e.g., three planes in the case of a triangular polygon), and at least one cap or surface orthogonal to the extended planes, at operation 610. A number of these planes may be created in such a way that they are vertical or orthogonal to the common plane, or in some cases, orthogonal relative to the test polygon, and contain or extend from each of the polygon's edges. An additional plane may be created based on the test polygon itself and may represent a bottom "cap" of the clipping volume. In some aspects, the polygons for which operation 610 is performed may include non-vertical polygons previously marked as occluded, as such polygons may still have unoccluded parts that occlude other polygons.

Each set of candidate polygons determined at operations 604 and 606 may then be compared with the clipping volumes created at operation 610, at operation 612. In some aspects, the number of comparisons may be reduced, for example, by only comparing a clipping volume with the corresponding set of candidate polygons selected to potentially occlude the test polygon corresponding to the clipping volume. In one example, the selection of the set of candidate occluding polygons at operation 604 may be configured to be smaller in size, such as by narrowing the requirements for identifying a polygon as potentially occluding the test polygon. If a polygon is determined, at operation 614, to be at least partly within the clipping volume of the test polygon, it may be discarded at operation 608. In some aspects, a polygon determined to be partly within the clipping volume may be split, such that the newly defined edge of the polygon follows or aligns with the clipping volume. In this scenario, the portion of the split polygon outside of the clipping volume may be kept, and the portion inside may be discarded. Each polygon not at least partly within or intersecting a clipping volume may be identified and output, at operation 616, for example to define a bottom or common plane-facing surface of the object/image data. This surface may then be used, for example, via process 300, to extrude an object/image data to a common plane and may be used to define the cap that bounds the extruded portion of the image data on the common plane.

Figure 7:
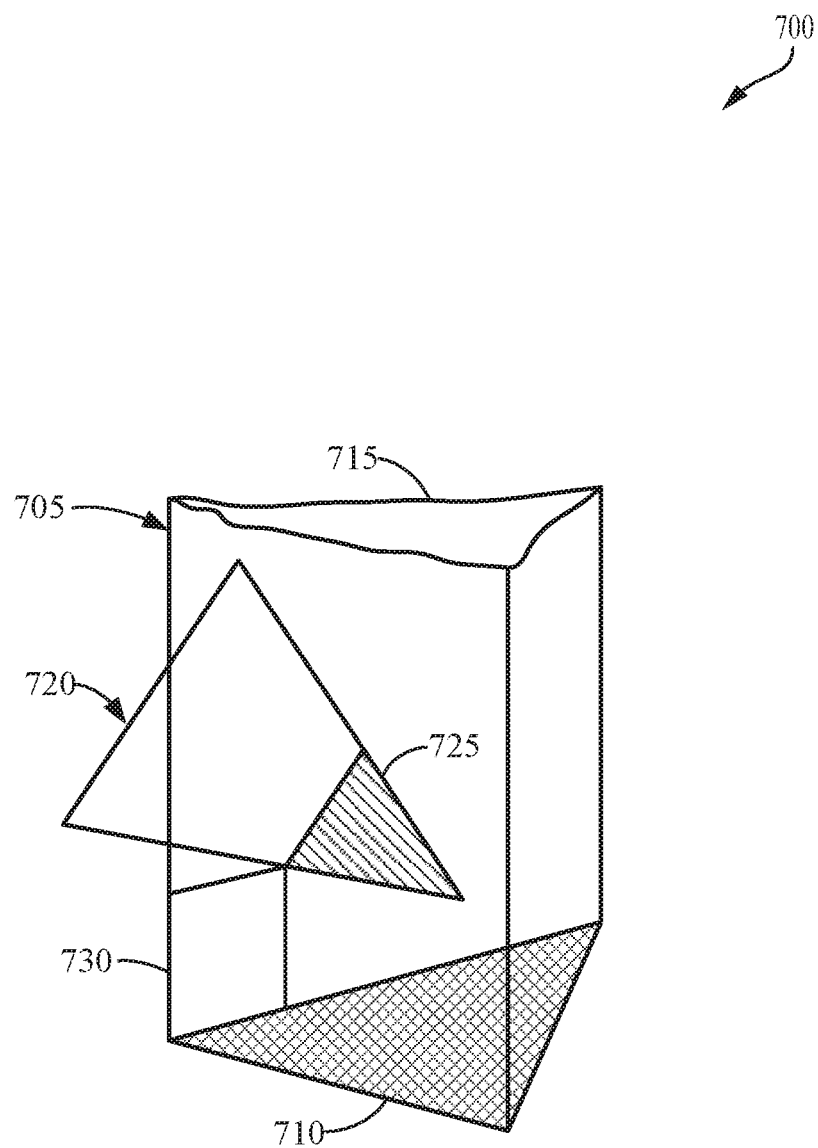
FIG. 7 illustrates an example diagram and process for determining which polygons of image data to use in extruding an object onto a plane.

FIG. 7 illustrates a diagram 700 of a polygon 720 compared to a clipping volume 705 generated for test polygon 715, for example, corresponding to operation 612 descried above with reference to FIG. 6. As illustrated, the clipping volume 705 may include three vertical walls extending from edges of a test polygon 715, which as illustrated is a triangle, having a cap 710 that has the same area as test polygon 715 located on the opposite end of the vertical walls. In one example, the clipping volume 705 may be generated via operation 610. Polygon 720 may be identified as part or all of a candidate set of polygons that may potentially occlude polygon 715, for example, via operations 604 and 606 described above. In one aspect, the polygon 720 (or a projection or extension thereof in one example), may be compared to the clipping volume 705 and determined to intersect/at least partially overlap the clipping volume 705. As illustrated, portion 725 of polygon 720 may be located within clipping volume 705, as represented by box 730 showing the intersection of the back vertical wall of clipping volume 705 with the portion 725. In one aspect, cap 710 may be retained, for example, as a candidate for a bottom or common plane cap for use in operations 324 or 328 of process 300 described above in reference to FIG. 3.

It should be appreciated that diagram 700, clipping volume 705, polygon 715, and test polygon 720 are only given by way of example. The described techniques contemplate a variety of shapes for polygons 715, 720, a variety of different volumes and processes for constructing clipping volume 705, etc.

Figure 8:
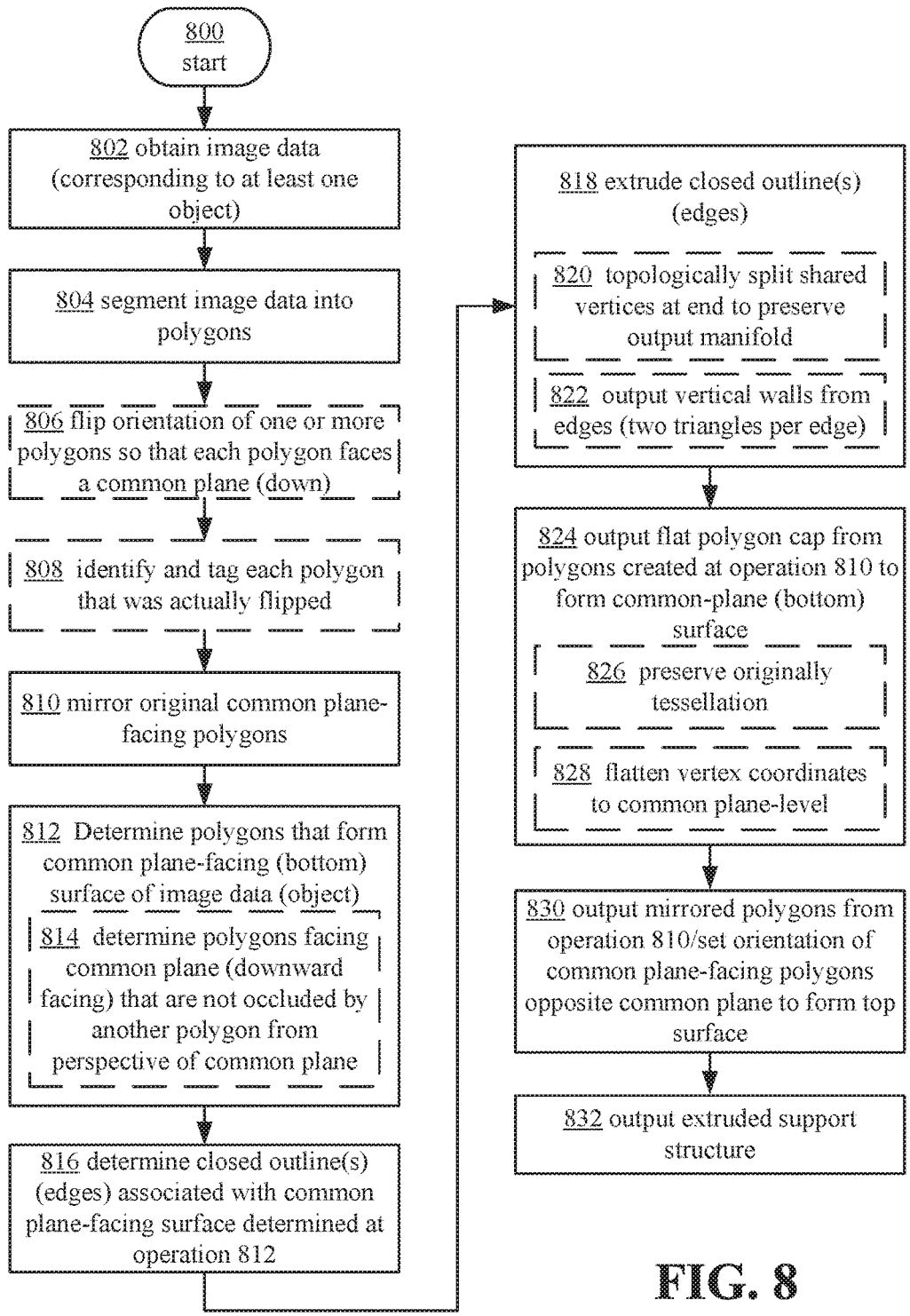
FIG. 8 depicts an example of a more detailed operational procedure for constructing a support for image data representing an object.

FIG. 8 illustrates an example process 800 for creating an extruded support structure for and separate from a 3D object, in accordance with the described techniques. Process 800 may be used to generate a separate mesh for an extruded portion or volume that fits or directly aligns with at least one surface of a 3D object that can be customized separately from the 3D objet, such as by assigning one or more different properties to the extruded portion, such as color, texture, or material, density, etc., for 3D printing, for example. Process 800 may be particularly useful, for example, when different applications, devices, users, etc., are to perform the 3D object creation and 3D printing tasks.

In one aspect, operation 800 may be applied to image data or an object that is non-manifold. In another aspect, process 800 may be implemented when the image data or object is manifold, or fully defines a volume of the image data or object. In this manifold scenario, operations 806 and 808 may be omitted from process 800. The output of process 800 may be a fully defined support structure that may fit or correspond with a common plane-facing or bottom surface of the 3D object/image data and may be separate from the underlying 3D object or image data. Process 800 may share one or more operations of process 300 described above in reference to FIG. 3.

Process 800 may begin at operation 802, where image data, such as 3D or partial 3D image data may be obtained, such that corresponds to at least one object. The image data may be segmented or otherwise divided into a number of polygons or shapes, according to any of a variety of techniques, such as based on one or more features of the image data, such as color, texture, shapes identified within the image data, etc., at operation 804.

In the non-manifold case, the orientation of one or more of the polygons or segments defining the image data may be flipped or modified, rotated, etc., so that each polygon faces a common plane, such as downward toward a around plane, at operation 806. Each polygon that was flipped may be identified and tagged or marked at operation 808, for example, for purposes of restoring the original surface later in process 800.

Next, at operation 810, original downward or common-plane facing polygons (e.g., not flipped at operation 806) may be mirrored, for example, such that a plane normal to each or all of the polygons is reversed. The result of operation 810 may be used to define the top or 3D object interfacing surface of the extruded portion output by process 800, such that the extruded portion may directly align with the downward or common plane-facing surface of the 3D object.

Next, at operation 812, polygons that form the common plane-facing surface of the image data/object may be determined. In one example, the common plane-facing surface may be the bottom surface or non-visible surface of the object. In some aspects, operation 812 may further include determining which polygons that face the common plane are not occluded (even in part) by another polygon from the perspective of the common plane at operation 814, as described in more detail above in reference to FIGS. 6 and 7. In some manifold cases, operations 814 may be excluded, as the manifold object may already define a bottom or common-plane facing surface.

At operation 816, closed outlines or edges of the common plane-facing surface from operation 812 may be determined. The outlines or edges may form any of a variety of shapes, having different sizes, etc. In one example, the surface defined by the closed outline may correspond to the bottom surface of the 3D object. In some aspects, this surface may not be complete, or may include multiple different surfaces. The closed outlines/edges may then be extruded to the common plane, at operation 818. In some aspects, operation 818 may further include topologically spitting shared vertices at an end to preserve the output manifold mesh or object, at operation 820 and outputting vertical walls from edges at operation 822.

Next, a flat polygon cap may be formed from the polygons determined at operation 812 parallel with the common plane and output at operation 824. In one aspect, operation 824 may be performed on the mirrored polygons produced at operation 810. Operation 824 may topologically close the output mesh from the bottom or common plane. In some aspects, operation 824 may further include preserving the original tessellation or geometric pattern of polygons of the original surface that was used to form the flat polygon cap at operation 826, and may further include flattening vertex coordinates of the common plane-facing surface to the common plane level to form the polygon cap or bottom surface, at operation 828. In some aspects, edges and vertices already extruded may take precedent over (e.g., be used in place o original (un-modified) edges and vertices.

The polygons mirrored at operations 810 may then be output to form the top or 3D object facing surface of the extruded support structure, at operation 830. In non-manifold examples, the orientation of the common plane facing polygons marked at operation 808 may be set opposite the common plane facing surface to, at least in part, define the top or 3D object-facing surface of the support structure. The extruded support structure, defining a separate volume from the 3D object, may then be output at operation 832.

In some non-manifold examples, a bottom surface of an otherwise undefined surface of an object may be generated via process 800, for example, to enable a support interface between the 3D object and the support structure. In some cases, this surface may be defined as the mirror of the top surface of the 3D object, may be defined as a flat surface parallel to the common plane, or may be defined as a predominantly flat surface with grooves, recesses, pegs, or other structures, to enable a more secure mating surface between the support structure and the 3D object.

In one example, the support structure of the mesh generated by process 800 may be edited (e.g., via a number of operations including intersect, subtract, move, resize, etc.) for example, before being sent to a 3D printer, contrary to known practices. Process 800 may enable users to share 3D objects and extrusion support structures with other users who may implement or use different 3D printer hardware and/or may utilize different 3D editing and modeling software.

In one example, a secondary stage component (e.g., a slicer/driver may convert the support structure (also referred to herein as a support envelope) into a printable support mesh, depending on the properties of material in use and the hardware capabilities. Traditional or existing 3D printing software typically generates support pillars automatically, such as after the user has already specified a print target or according to an automatic (non-editable) configuration. In some cases, existing printing software may enable only a limited amount of configuration, such as by allowing a user to delete or add support pillars after the support structure has already been generated according to a set process. Process 800, conversely, enables the content creator to define a support material 3D envelope and tune and configure the envelope for a particular 3D model and application, without having to rely on assumptions about the hardware, and without having constraints imposed by the slicer/driver via automatic non-editable generation of the support structure.

In some aspects, for single extruder FDM-based printers (e.g., where the support material is the same as the object material) the top triangles/polygons that define the top or 3D object interfacing surface of the support structure may be shifted down with a z-axis (vertical) gap or offset. This may enable the material used to print the support structure (e.g., plastic) to solidify and reduce adherence to the 3D object, thus making the support structure easy to remove. For 3D printers that use dissolvable materials to print the support structure, it is important to maintain 0 z-axis gap to reduce the deformations of the object on top of the support and increase adherence to the object. For printers that do not require support structures to be printed with the 3D object (e.g., binder jetting), the support structure may simply be discarded in the driver, and not actually printed. In many cases, the support structure or mesh may be transformed from a solid to a zig-zag or other partially-solid pattern (reduced density of material) to reduce the material used and energy required to print the support mesh for the 3D object.

Figure 9:
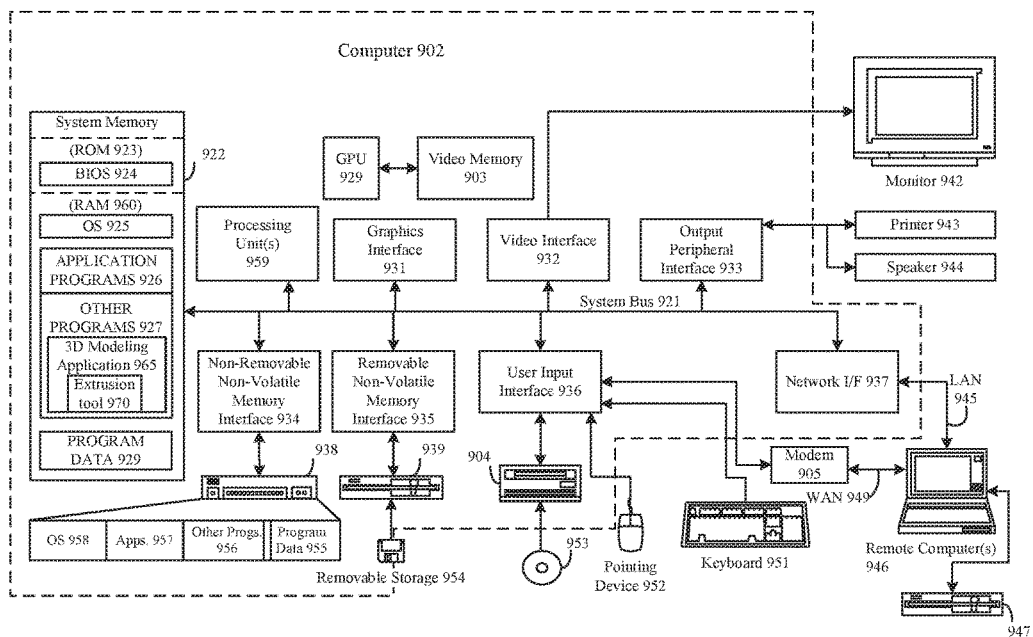
FIG. 9 depicts an example general purpose computing environment in which the techniques described herein may be embodied.

The 3D modeling or builder application, including the 3D object extrusion techniques, and/or user interface 200 described above may be implemented on one or more computing devices or environments, as described below. FIG. 9 depicts an example general purpose computing environment in which in which some of the techniques described herein may be embodied. The computing system environment 902 is only one example of a suitable computing environment and is not intended to suggest any limitation as to the scope of use or functionality of the presently disclosed subject matter. Neither should the computing environment 902 be interpreted as having any dependency or requirement relating to any one or combination of components illustrated in the example operating environment 902. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 902, which may include any of a mobile device or smart phone, tablet, laptop, desktop computer, cloud computing resources, etc., typically includes a variety of computer-readable media. Computer-readable media can be any available media that can be accessed by computer 902 and includes both volatile and nonvolatile media, removable and non-removable media. The system memory 922 includes computer-readable storage media in the form of volatile and/or nonvolatile memory such as read only memory (ROM) 923 and random access memory (RAM) 960. A basic input/output system 924 (BIOS), containing the basic routines that help to transfer information between elements within computer 902, such as during start-up, is typically stored in ROM 923. RAM 960 typically contains data and/or program modules that are immediately accessible to and/or presently being operated on by processing unit 959. By way of example, and not limitation, FIG. 9 illustrates operating system 925, application programs 926, other program modules 927 including a 3D modeling application 965 with an extrusion tool 970, and program data 929.

The computer 902 may also include other removable/non-removable, volatile/nonvolatile computer storage media. By way of example only, FIG. 9 illustrates a hard disk drive 938 that reads from or writes to non-removable, nonvolatile magnetic media, a magnetic disk drive 939 that reads from or writes to a removable, nonvolatile magnetic disk 954, and an optical disk drive 904 that reads from or writes to a removable, nonvolatile optical disk 953 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 938 is typically connected to the system bus 921 through a non-removable memory interface such as interface 934, and magnetic disk drive 939 and optical disk drive 904 are typically connected to the system bus 921 by a removable memory interface, such as interface 935 or 936.

The drives and their associated computer storage media discussed above and illustrated in FIG. 9, provide storage of computer-readable instructions, data structures, program modules and other data for the computer 902. In FIG. 9, for example, hard disk drive 938 is illustrated as storing operating system 958, application programs 957, other program modules 956, and program data 955, Note that these components can either be the same as or different from operating system 925, application programs 926, other program modules 927, and program data 929. Operating system 958, application programs 957, other program modules 956, and program data 955 are given different numbers here to illustrate that, at a minimum, they are different copies. A user may enter commands and information into the computer 902 through input devices such as a keyboard 951 and pointing device 952, commonly referred to as a mouse, trackball or touch pad. Other input devices (not shown) may include a microphone, joystick, game pad, satellite dish, scanner, or the like. These and other input devices are often connected to the processing unit 959 through a user input interface 936 that is coupled to the system bus 921, but may be connected by other interface and bus structures, such as a parallel port, game port or a universal serial bus (USB). A monitor 942 or other type of display device is also connected to the system bus 921 via an interface, such as a video interface 932. In addition the monitor, computers may also include other peripheral output devices such as speakers 944 and printer 943, such as a 3D printer, which may be connected through an output peripheral interface 933.

The computer 902 may operate in a networked environment using logical connections to one or more remote computers, such as a remote computer 946. The remote computer 946 may be a personal computer, a server, a router, a network PC, a peer device or other common network node, and typically includes many or all of the elements described above relative to the computer 902, although only a memory storage device 947 has been illustrated in FIG. 9. The logical connections depicted in FIG. 9 include a local area network (LAN) 945 and a wide area network (WAN) 949, but may also include other networks. Such networking environments are commonplace in offices, enterprise-wide computer networks, intranets and the Internet.

When used in a LAN networking environment, the computer 902 is connected to the LAN 945 through a network interface or adapter 937. When used in a WAN networking environment, the computer 902 typically includes a modem 905 or other means for establishing communications over the WAN 949, such as the Internet. The modem 905, which may be internal or external, may be connected to the system bus 921 via the user input interface 936, or other appropriate mechanism. In a networked environment, program modules depicted relative to the computer 902, or portions thereof, may be stored in the remote memory storage device. By way of example, and not limitation, FIG. 9 illustrates remote application programs 948 as residing on memory device 947. It will be appreciated that the network connections shown are merely examples, and other means of establishing a communications link between the computers may be used.

In some aspects, other programs 927 may include a 3D modeling or builder application 965 that includes the functionality as described above, such as in an extrusion tool 970. In some cases, the 3D modeling application 965/extrusion tool 970 may execute processes 300, 600, and/or 800, and provide a user interface 200, as described above, through graphics interface 931, video interface 932, output peripheral interface 933, and/or one or more monitors or touch screen devices 942. In some aspects, the 3D modeling application 965/extrusion tool 970 may communicate with 3D printer 943 to produce a physical 3D model of the 3D image data and a corresponding support structure or mesh, as described above. In some aspects, other programs 927 may include one or more 3D virtualization applications that may obtain and provide images that may be displayed of 3D models generated by 3D modeling application 965.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or aft of the modules, systems and data structures may also be stored (e.g., as software instructions or structured data on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for integrating a three dimensional (3D) support structure with a 3D object, the system comprising a processor and memory, the system programmed to perform the following operations:

receive image data of a 3D object;
   segment the image data into a plurality of polygons;
   modify an orientation of a polygon from the plurality of polygons such that the polygon faces a common plane;
   define a common plane-facing surface comprising the polygon with the modified orientation, the common plane-facing surface having one or more edges and being parallel to the common plane;
   extend the one or more edges to the common plane;
   generate a bottom surface based on the common plane-facing surface to define the 3D support structure associated with the 3D object, wherein the bottom surface is parallel with the common plane, and wherein the bottom surface is bound by the one or more extended edges such that the extended edges are aligned with the bottom surface;
   restore the orientation of the polygon;
   define the support structure separate from the 3D object based on the restored orientation of the polygon;
   integrate the 3D support structure with the 3D object that includes the polygon with the restored orientation;
   generate a 3D model including the integrated 3D support structure and the 3D object; and
   perform one or more of the following operations:
      display the generated 3D model including the integrated 3D support structure and the 3D object; and
      send the generated 3D model including the integrated 3D support structure and the 3D object for printing.

2. The system of claim 1, further comprising a 3D printer configured to fabricate the 3D model.

3. The system of claim 1, wherein generating the bottom surface based on the common plane-facing surface comprises modifying one or more coordinates of the common plane-facing surface to be located on the common plane.

4. The system of claim 1, wherein the system is further programmed to perform the following operations:
   select a first polygon of the plurality of polygons;
   determine a subset of polygons that are proximate to the first polygon;
   determine if one or more polygons of the subset occlude the first polygon; and
   discard, from being used to define the common plane-facing surface, the one or more polygons determined to occlude the first polygon, to define the common plane-facing surface.

5. The system of claim 1, wherein generating the bottom surface comprises splitting one or more vertices shared by at least two of the plurality of polygons.

6. The system of claim 1, wherein defining the common plane facing surface having the one or more edges comprises connecting two or more of the plurality of polygons to form the one or more edges.

7. A method for generating a three-dimensional (3D) support structure, the method comprising:
   receiving image data of a 3D object;
   segmenting the image data into a plurality of polygons;
   modifying an orientation of a polygon from the plurality of polygons such that the polygon faces a common plane;
   defining a common plane-facing surface comprising the polygon with the modified orientation, the common plane-facing surface having one or more edges and being parallel to the common plane;
   extending the one or more edges to the common plane;
   generating a bottom surface based on the common plane-facing surface to define the 3D support structure associated with the 3D object, wherein the bottom surface is parallel with the common plane, and wherein the bottom surface is bound by the one or more extended edges such that the extended edges are aligned with the bottom surface;

restoring the orientation of the polygon;

defining the support structure separate from the 3D object based on the restored orientation of the polygon;

integrating the 3D support structure with the 3D object that includes the polygon with the restored orientation;

generating a 3D model including the 3D support structure and the 3D object; and performing one or more of the following operations:
displaying the generated 3D model including the integrated 3D support structure and the 3D object; and
sending the generated 3D model including the integrated 3D support structure and the 3D object for printing.

8. The method of claim 7, wherein defining the common plane-facing surface further comprises:
selecting a first polygon of the plurality of polygons;
determining a subset of polygons that are proximate to the first polygon;
determining if one or more polygons of the subset occlude the first polygon; and
discarding, from being used to define the common plane-facing surface, the one or more polygons determined to occlude the first polygon.

9. The method of claim 7, further comprising:
assigning at least one first property to the 3D object; and
assigning at least one second property to the support structure, wherein the first property is different from the second property.

10. The method of claim 7, wherein defining the common plane-facing surface having the one or more edges comprises connecting two or more of the plurality of polygons to form the one or more edges.

11. The method of claim 7, wherein generating the bottom surface comprises splitting one or more vertices shared by at least two of the plurality of polygons.

12. The method of claim 7, wherein extending the one or more edges to the common plane comprises defining at least two triangles for every one of the one or more edges to form a vertical wall of the 3D object.

13. The method of claim 7, wherein generating the bottom surface based on the common plane-facing surface comprises modifying one or more coordinates of the common plane-facing surface to be located on the common plane.

14. The method of claim 7, wherein the image data of the 3D object only partially defines the 3D object.

15. A computer readable storage device having stored thereon instructions that, upon execution by at least one processor, cause the at least one processor to perform operations for generating a three-dimensional (3D) support structure, the operations comprising:
receiving image data of a 3D object;
segment the image data into a plurality of polygons;
modifying an orientation of a polygon from the plurality of polygons such that the polygon faces a common plane;
defining a common plane-facing surface comprising the polygon with the modified orientation, the common plane-facing surface having one or more edges and being substantially parallel to the common plane;
extending the one or more edges to the common plane;
generating a bottom surface based on the common plane-facing surface to define a 3D support structure associated with the 3D object, wherein the bottom surface is parallel with the common plane, and wherein the bottom surface is bound by the one or more extended edges such that the extended edges are aligned with the bottom surface;
restoring the orientation of the polygon;
defining the support structure separate from the 3D object based on the restored orientation of the polygon;
integrating the 3D support structure with the 3D object that includes the polygon with the restored orientation;
generating a 3D model including the integrated 3D support structure and the 3D object; and
performing one or more of the following operations:
displaying the generated 3D model including the integrated 3D support structure and the 3D object; and
sending the generated 3D model including the integrated 3D support structure and the 3D object for printing.

16. The computer readable storage device of claim 15, wherein generating the bottom surface based on the common plane-facing surface comprises modifying one or more coordinates of the common plane-facing surface to be located on the common plane.

17. The computer readable storage device of claim 15, wherein extending the one or more edges to the common plane comprises defining at least two triangles for every one of the one or more edges to form a vertical wall of the 3D object.

18. The computer readable storage device of claim 15, wherein the operations further comprise:
selecting a first polygon of the plurality of polygons;
determining a subset of polygons that are proximate to the first polygon;
determining if one or more polygons of the subset occlude the first polygon; and
discarding, from being used to define the common plane-facing surface, the one or more polygons determined to occlude the first polygon.

19. The computer readable storage device of claim 15, wherein generating the bottom surface comprises splitting one or more vertices shared by at least two of the plurality of polygons.

20. The computer readable storage device of claim 15, wherein defining the common plane facing surface having the one or more edges comprises connecting two or more of the plurality of polygons to form the one or more edges.

* * * * *